United States Patent
Ahmed et al.

(10) Patent No.: US 7,676,450 B2
(45) Date of Patent: Mar. 9, 2010

(54) NULL AWARE ANTI-JOIN

(75) Inventors: Rafi Ahmed, Fremont, CA (US); Angela Amor, Menlo Park, CA (US)

(73) Assignee: Oracle International Corporation, Redwood Shores, CA (US)

( * ) Notice: Subject to any disclaimer, the term of this patent is extended or adjusted under 35 U.S.C. 154(b) by 328 days.

(21) Appl. No.: 11/716,462

(22) Filed: Mar. 8, 2007

(65) Prior Publication Data
US 2007/0219952 A1  Sep. 20, 2007

Related U.S. Application Data

(60) Provisional application No. 60/782,785, filed on Mar. 15, 2006.

(51) Int. Cl.
*G06F 17/30* (2006.01)
(52) U.S. Cl. ............................................. 707/2; 707/5
(58) Field of Classification Search ................. 707/2–5
See application file for complete search history.

(56) References Cited

U.S. PATENT DOCUMENTS

| | | | | |
|---|---|---|---|---|
| 5,732,258 | A | * | 3/1998 | Jakobsson et al. ............... 707/4 |
| 5,761,654 | A | * | 6/1998 | Tow ................................ 707/2 |
| 5,832,477 | A | | 11/1998 | Bhargava et al. |
| 5,857,180 | A | | 1/1999 | Hallmark et al. |
| 5,963,933 | A | * | 10/1999 | Cheng et al. .................... 707/2 |
| 6,026,394 | A | | 2/2000 | Tsuchida et al. |
| 6,044,378 | A | | 3/2000 | Gladney |
| 6,061,676 | A | | 5/2000 | Srivastava et al. |
| 6,289,334 | B1 | | 9/2001 | Reiner et al. |
| 6,298,342 | B1 | | 10/2001 | Graefe et al. |
| 6,339,768 | B1 | | 1/2002 | Leung et al. |
| 6,370,524 | B1 | | 4/2002 | Witkowski |
| 6,449,606 | B1 | * | 9/2002 | Witkowski ...................... 707/3 |
| 6,529,896 | B1 | | 3/2003 | Leung et al. |
| 6,529,901 | B1 | | 3/2003 | Chaudhuri et al. |
| 6,694,306 | B1 | | 2/2004 | Nishizawa et al. |
| 6,834,279 | B1 | * | 12/2004 | Chiang ........................... 707/2 |
| 6,934,699 | B1 | | 8/2005 | Haas et al. |
| 7,072,896 | B2 | | 7/2006 | Lee et al. |
| 7,089,225 | B2 | | 8/2006 | Li et al. |
| 7,246,108 | B2 | | 7/2007 | Ahmed |
| 2001/0047372 | A1 | | 11/2001 | Gorelik et al. |

(Continued)

OTHER PUBLICATIONS

Deutsch, Alin et al., "Minimization and Group-By Detection for Nested XQueries", University of California, San Diego, 2003, 15 pages.

(Continued)

*Primary Examiner*—Tim T. Vo
*Assistant Examiner*—Shiow-Jy Fan
(74) *Attorney, Agent, or Firm*—Hickman Palermo Truong & Becker LLP

(57) ABSTRACT

Techniques for performing a "null-aware" anti-join operation are described. Unnesting using anti-join of NOT IN/ALL subquery uses null-aware anti-join operation, resulting in a rewritten query that, when computed, produces results consistent with the NULL semantics of NOT IN/ALL subquery. The semantics of the "null-aware" anti-join operation allow the query having the NOT IN/ALL subquery to be rewritten even though a no-NULL restriction requirement, for the operands of the anti-join condition in the query, may not be met.

32 Claims, 4 Drawing Sheets

U.S. PATENT DOCUMENTS

| | | | |
|---|---|---|---|
| 2004/0220911 | A1 | 11/2004 | Zuzarte et al. |
| 2004/0220923 | A1 | 11/2004 | Nica |
| 2005/0055382 | A1 | 3/2005 | Ferrat et al. |
| 2005/0076018 | A1 | 4/2005 | Neidecker-Lutz |
| 2005/0149584 | A1 | 7/2005 | Bourbonnais et al. |
| 2005/0187917 | A1 | 8/2005 | Lawande et al. |
| 2005/0198013 | A1 | 9/2005 | Cunningham et al. |
| 2006/0167865 | A1 | 7/2006 | Andrei |
| 2008/0010240 | A1 | 1/2008 | Zait |

OTHER PUBLICATIONS

DeHaan, David, "A Rewriting Algorithm for Multi-Block Aggregation Queries and Views using Prerequisites and Compensations", University of Waterloo, Canada, Technical Report CS-2004-25, May 3, 2004, 39 pages.

Chaudhuri, Surajit, "An Overview of Query Optimization in Relational Systems", Microsoft Research, 1998, 10 pages.

Muralikrishna, M., "Improved Unnesting Algorithms for Join Aggregate SQL Queries", VLDB Conference, Canada, 1992, 12 pages.

Hayu, John, "Analytic SQL Features in Oracle9i", An Oracle Technical White Paper, Dec. 2001, 32 pages.

Oracle, "Optimizer Modes, Plans Stability, and Hints", Oracle8i Tuning Release 8.1.5 A67775-01, Oracle Website, 1999, 54 pages.

Chen, et al., "View merging in the context of view selection changing", Database Engineering and Applications Symposium 2002, Proceedings, Jul. 2002, 10 pages.

* cited by examiner

NULL AWARE ANTI-JOIN

RELATED APPLICATIONS

The present application claims priority to U.S. Provisional Application No. 60/782,785 entitled Cost Based Query Transformation—Join Factorization And Group By Placement, filed on Mar. 15, 2006 by Hong Su, et al., the content of which is incorporated herein by reference.

FIELD OF THE INVENTION

The present invention relates to database systems, and in particular, to optimization of queries executed by a database system.

BACKGROUND

Relational and object-relational database management systems store information in tables of rows in a database. To retrieve data, queries that request data are submitted to a database server, which computes the queries and returns the data requested.

Queries submitted to the database server must conform to the syntactical rules of a particular query language. One popular query language, known as the Structured Query Language (SQL), provides users a variety of ways to specify information to be retrieved.

A query submitted to a database server is evaluated by a query optimizer. Based on the evaluation, the query optimizer generates an execution plan that defines operations for executing the query. Typically, the query optimizer generates an execution plan optimized for efficient execution. The optimized execution plan may be based on a rewrite of the query.

A common type of query that is optimized is a query that contains a subquery whose join condition involves the NOT IN/ALL operator (NOT IN is equivalent to !=ALL). In datawarehouses with reporting applications, such queries and subqueries are usually evaluated on very large sets of data. Thus, it is critical to make such queries scale in any SQL execution engine. When such queries are not optimized using anti-join, the subquery is executing an operation that is effectively a Cartesian product, which is quite inefficient.

One common technique for optimizing these kinds of queries is anti-join unnesting. In anti-join unnesting, a subquery operand of an NOT IN/ALL operator is either merged with the containing "outer query" or an inline view is created for the subquery and the columns in the join condition of the NOT IN/ALL operator are used to form a join condition of an anti-join. To illustrate anti-join unnesting, the following query Q1 is transformed into Q2. Note that in this example both the columns T1.x and T2.y contain only non-null values.

```
Q1:  SELECT T1.c
     FROM T1
     WHERE T1.x NOT IN (SELECT T2.y
                        FROM T2
                        WHERE T2.z > 10);
Q2:  SELECT T1.c
     FROM T1, T2
     WHERE T1.x A= T2.y and T2.z > 10;
```

Query Q1 is rewritten by merging the subquery operand of the NOT IN operator of Q1 into Q1's outer query to produce query Q2. Query Q2 contains the anti-join operator T1.x A=T2.y, which is based on the join columns (i.e. T1.x, T2.y) of the NOT IN operator in query Q1. The anti-join operator specifies the join condition T1.x A=T2.y. A condition that compares columns between tables, is hereafter referred to as a join condition. A joining column is a column being compared, by an operator in a join condition, to a column of another table. Query Q2 may be executed far more efficiently than query Q1. Note that the anti-join operator A= is non-standard SQL and is used here for the purpose of illustration only.

The anti-join is an asymmetric join, where a row of the "left table" is returned only if it does not match (i.e. does not satisfy the connecting condition) with any row in the "right table". The term "left" is used to designate the table whose rows are returned by an anti-join operation, and not to designate the table's position within an expression. Similarly, the term "right" is used to designate the table whose rows are to be matched (or not) to a left table by an anti-join operation, and not to designate the table's position within an expression. Nevertheless, the notation T1.x A=T2.y is used to represent an anti-join, where T1 is the table on the left of the anti-join and T2 is the table on the right of the anti-join.

The term table refers generally to any set of rows or tuples stored in a database table or computed for an expression, such as a query or subquery. For example, the rows returned by the NOT IN/ALL subquery of Q1 can be referred to as a table.

In Q2, under the semantics of an anti-join, for each row of T1, the join condition T1.x=T2.y is evaluated, and if no match is found with any row of T2, then that row of T1 is returned. The semantics of evaluating the NOT IN/ALL subquery in Q1 is identical to the semantics of the anti-join summarized below.

1. If T2 contains no rows after the application of the filter predicate, then return all the rows of T1 and terminate.
2. For each row of T1, return the row, if T1.x has no match with any row of T2.

The anti-join unnesting transformation of Q1 to Q2 is an example of one form anti-join unnesting in which a subquery is merged into the outer query. In another form, a subquery is converted into an inline view of the outer query. The transformation of Q3 to Q4 illustrates this latter form. Again in this example, both the columns T1.x and T2.y contain only non-null values.

```
Q3:  SELECT T1.c
     FROM T1
     WHERE T1.x NOT IN (SELECT T2.y
                        FROM T2, T3
                        WHERE T2.z = T3.w
                              and T2.k > 10);
Q4:  SELECT T1.c
     FROM T1,
          (SELECT T2.y AS Y
           FROM T2, T3
           WHERE T2.z = T3.w
                 and T2.k > 10) V
     WHERE T1.x A= V.y;
```

Query Q4 is rewritten by converting the subquery operand of the NOT IN operator of Q3 into inline view V of Q4. Query Q4 contains the anti-join operator T1.x A=T2.y, which is based on the join columns (i.e. T1.x, T2.y) of the NOT IN operator in query Q3. The anti-join operator specifies the join condition T1.x A=T2.y.

Unfortunately, anti-join unnesting for NOT IN/ALL subqueries may only be performed when a certain restriction, referred to herein as the no-NULL restriction, is met. The no-NULL restriction requires that both operands of the anti-join condition are free of NULL values for every row in the left and right tables. For example, query Q1 satisfies the no-NULL restriction only when column T1.x does not contain any NULL values, and no row in T2 that satisfies the predicate filter condition T2.z contains a NULL value in column T2.y.

The no-NULL restriction bars anti-join unnesting for a large proportion of NOT IN/ALL subqueries; therefore the optimizer is forced to choose a sub-optimal plan. Clearly, there is a need for techniques and mechanisms for performing anti-join unnesting when the no-NULL restriction is not satisfied.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Described herein are techniques for performing a "null-aware" anti-join operation. Anti-join unnesting rewrite of NOT IN/ALL subqueries that use a null-aware anti-join operation results in a rewritten query that, when computed, produces results consistent with the NOT IN/ALL subqueries.

Illustrative Operational Environment

Figure 1:
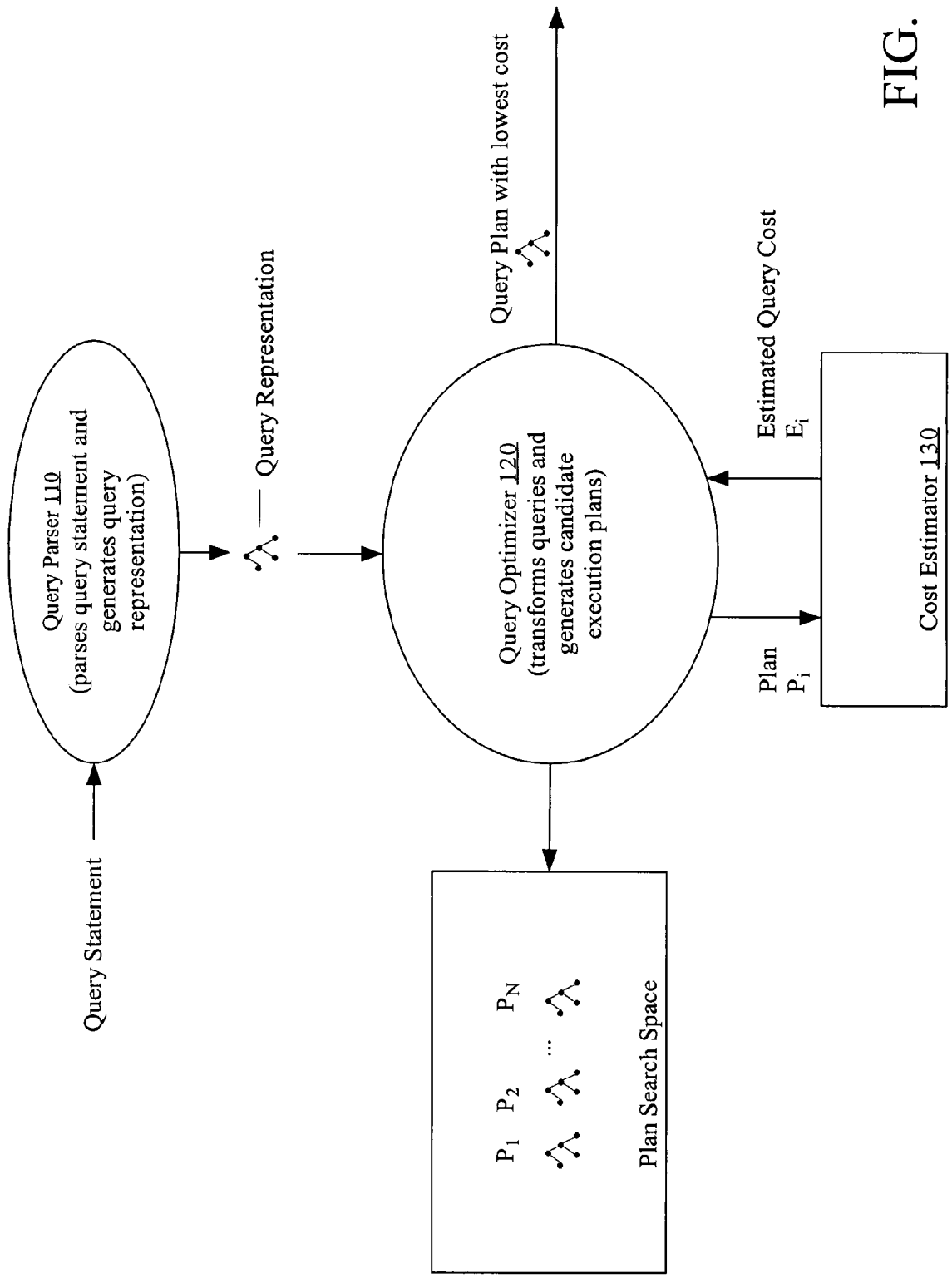
FIG. 1 is a diagram of a query optimizer according to an embodiment of the present invention.

FIG. 1 is a diagram depicting a query optimizer and related components within a database server (not shown) used to implement an embodiment of the present invention. Generally, a server, such as a database server, is a combination of integrated software components and an allocation of computational resources, such as memory, a node, and processes on the node for executing the integrated software components, where the combination of the software and computational resources are dedicated to providing a particular type of function on behalf of clients of the server. A database server governs and facilitates access to a particular database, processing requests by clients to access the database.

A database comprises data and metadata that is stored on a persistent memory mechanism, such as a set of hard disks. Such data and metadata may be stored in a database logically, for example, according to relational and/or object-relational database constructs. Database applications interact with a database server by submitting to the database server commands that cause the database server to perform operations on data stored in a database. A database command may be in the form of a database statement. For the database server to process the database statements, the database statements must conform to a database language supported by the database server. One non-limiting database language supported by many database servers is SQL, including proprietary forms of SQL supported by such database servers as Oracle, (e.g. Oracle Database 10 g). SQL data definition language ("DDL") instructions are issued to a database server to create or configure database objects, such as tables, views, or complex types.

Query Optimizer and Execution Plans

Referring to FIG. 1, query parser 110 receives a query statement and generates one or more different candidate execution plans for a query, which are evaluated by query optimizer 120 to determine which should be used to compute the query. The one or more candidate execution plans that are evaluated for this purpose are collectively referred to as the plan search space or search space. For a given query, a search space may include candidate execution plans $P_1$, $P_2$ through $P_N$.

To evaluate the candidate execution plans in the search space, query optimizer 120 estimates a cost of each candidate execution plan and compares the estimated query costs to select an execution plan for execution. In an embodiment, the estimated query cost is generated by a query cost estimator 130, which may be a component of query optimizer 120. For a plan $P_i$ supplied by query optimizer 120, cost estimator 130 computes and generates an estimated query cost $E_i$. In general, the estimated query cost represents an estimate of computer resources expended to execute an execution plan. To determine which candidate execution plan in the search space to execute, query optimizer 120 selects the candidate execution plan with the lowest estimated cost.

Query optimizer 120 may optimize a query by transforming the query. In general, transforming a query involves rewriting a query into another semantically equivalent query that should produce the same result and that can potentially be executed more efficiently, i.e. one for which a potentially more efficient and less costly execution plan can be generated. Examples of query transformation include view merging, subquery unnesting, predicate move-around and push-down, common subexpression elimination, outer-to-inner join conversion, materialized view rewrite, and star transformation.

The query that has undergone some type of transformation is referred to herein as the transformed query. The query is rewritten by manipulating a copy of the query representation to form a transformed query representation.

One or more alternate transformations may be performed, and for each alternate transformation, one or more candidate execution plans are generated. Thus, a search space may contain candidate execution plans for multiple transformations, and multiple candidate execution plans for a single query transformation.

The Bane of Nulls

The SQL-Standard has varied semantics for dealing with NULL values, which may be used for various operators. For NOT IN/ALL as well as other types of operators, any relational comparison with NULL values always evaluates to FALSE. For example, the predicates, 5=NULL, 5 !=NULL, NULL=NULL, NULL !=NULL, all evaluate to FALSE. However, for other operations, such as those performed for GROUP BY, MINUS, INTERSECT, NULL values 'match' null values. These two semantics can be broadly categorized as horizontal and vertical semantics. Operations for NOT IN/ALL follow the horizontal semantics while the operations for GROUP BY, MINUS, INTERSECT follow vertical semantics.

Furthermore, the NOT IN (i.e. !=ALL) operator is a set non-membership operator and can be expressed as a conjunction of inequalities. The operators <ALL, ←ALL, >ALL and >=ALL, can be similarly expressed.

To illustrate, suppose the subquery in query Q1 that is the right operand of the NOT IN operator returns the following set of values {7, 8, 11, NULL}. The NOT IN operator can be expressed as follows:

T1.x !=7 and T1.x !=8 and T1.x !=11 and T1.x !=NULL

The above expression evaluates to FALSE, since T1.x !=NULL always evaluates to FALSE irrespective of the value of T1.x. Thus, in any case, Q1 should return no rows.

Suppose T1.x has the following set of values: {NULL, 5, 8, 11). Query Q2, the transformed query generated by regular anti-join unnesting, incorrectly returns {NULL, 5}.

Suppose the subquery in Q1 returns the following set of values {7, 8, 11} and T1.x has the same set of values {NULL, 5, 8, 11}. The correct result of Q1 is {5}. Regular anti-join unnesting again incorrectly returns {NULL, 5}.

Now suppose the subquery returns an empty set { }. The correct result is the entire set of values of T1.x: {NULL, 5, 8, 11}. In this case, regular anti-join unnesting produces the correct result.

NULL-Aware Anti-join

A null-aware anti-join qualifies rows consistent with NULL semantics of a NOT IN/ALL subquery. The following non-standard notation T1.x NA=T2.y is used to represent a null-aware anti-join, where T1 is the left table of the anti-join and T2 is the right table of the anti-join. The join condition of the NULL aware anti-join is T1.x=T2.y. A NULL aware anti-join is not limited to connecting conditions based on equality; the operators >, >=, <, ← are also allowed in null aware anti-join. An anti-join operation that does not follow these semantics is referred to hereafter as a regular anti-join.

The subquery in Q1 can be rewritten under anti-join unnesting using a null-aware anti-join as shown in query Q5.

Q5:
SELECT T1.c
FROM T1, T2
WHERE T1.x NA=T2.y and T2.z>10;

The semantics of null-aware anti-join can be described by the example of the query Q1 and Q5. It should be noted that the null-aware anti-join is performed after application of the filter predicate T2.z>10.

1. If T2 contains no rows, then qualify all rows of T1 for the null-aware anti-join and terminate. This is identical to a regular anti-join. If there are NULL values in T1.x in the left rows, these are returned in this case. The term "qualify" with respect to an anti-join or null-aware anti-join means to be placed or returned within the result of an anti-join or null-aware anti-join operation.

2. If after the application of the filter predicate T2.z>10, T2.y contains a NULL value, then qualify no rows for the null-aware anti-join operation and terminate. This is an important difference between a regular anti-join and a null-aware anti-join. If a NULL value is found in the table on the right, then no rows are qualified for the null-aware anti-join.

3. For each row of T1 with a non-NULL value in T1.x, then qualify the row for the null-aware anti-join, if T1.x has no match with any row of T2. This is similar to that of a regular anti-join, except that a row from the left table is not qualified if it has a NULL value in the anti-join condition. The row is disqualified without checking its matching condition.

Computing NULL-aware Anti-join

Like a regular anti-join, a null-aware anti-join may be computed using three different types of join operations: a sort-merge join, hash-join and a nested-loops join. When query optimizer 120 receives a query that includes a NOT IN/ALL subquery, it may generate a candidate execution plan for each of the join types, to compare the costs and select an execution plan based on the costs. Because of the different NULL semantics used, a sort-merge, hash and nested-loops join are executed differently between a regular anti-join and NULL-aware anti-join. Procedures for performing a sort-merge join, a hash-join and a nested-loops join for a NULL-aware anti-join are described below.

Terminology

Referring to a row from the left or right as matching a join condition or as matching a row from the table on the other side means that a join condition is satisfied by the rows and that any filter condition that should be applied to a row from the left table ("left-side filter condition") or a row from the right table ("right-side filter condition") is satisfied. For example for query Q5, when a row from T1 matches a row from T2, then join condition T1.x=T2.y and the right side filter condition T2.z>10 are satisfied with respect to the rows.

Referring to a row as containing a NULL value means that the row contains a NULL value in a joining column and satisfies any left-side or right-side filter conditions that should apply, if any. For example for query Q5, when a row from right table T2 contains a NULL value, the row contains a NULL value in column T2.y and satisfies the right side filter condition T2.z>10.

Referring to a right table as being empty or containing no rows, means no row in the right table satisfies any right-side filter conditions that apply. For example, in query Q5, referring to right table T2 as containing no rows means that no rows in T2 satisfy the right-side filter condition T2.z>10. Further, the right table may not contain any rows. The right table may also be a view (rather than a base table), which does not return any rows after its joins and filters are evaluated.

Sort Merge Join

Figure 2:
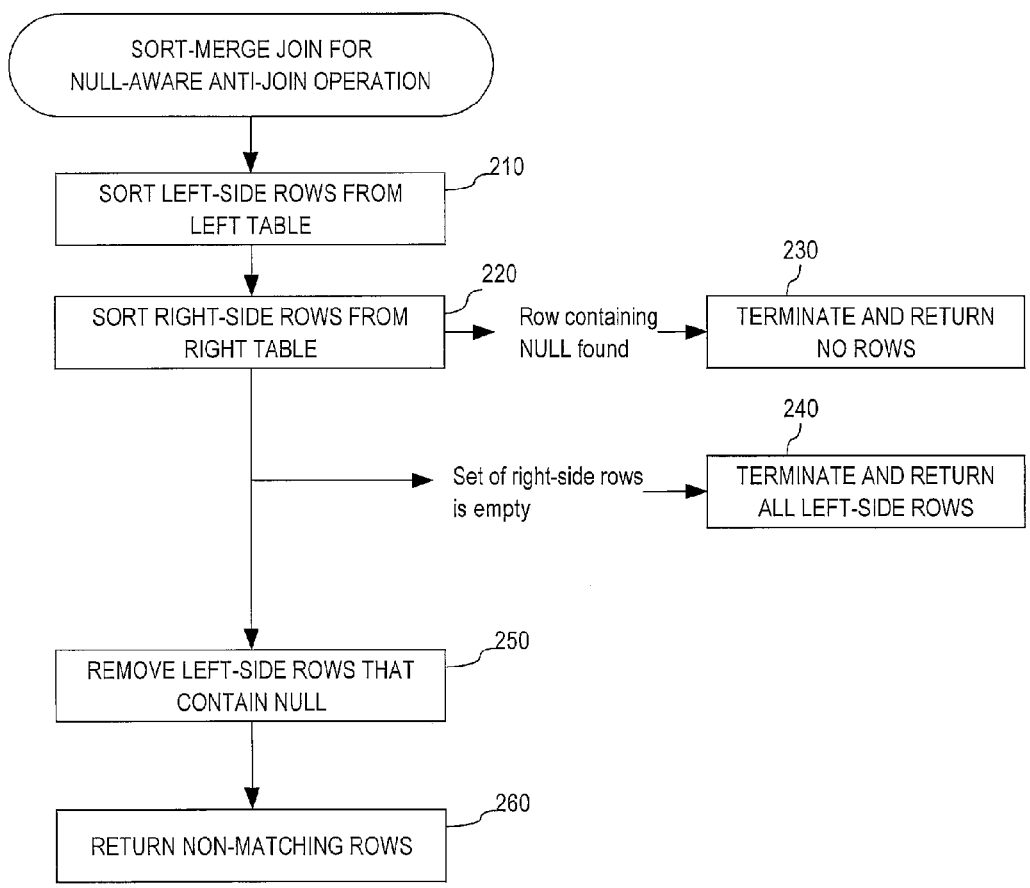
FIG. 2 depicts a procedure for performing a NULL aware sort-merge join according to an embodiment of the present invention.

FIG. 2 is a flow chart showing a procedure for performing a sort-merge join for a null-aware anti-join. Referring to FIG. 2, at 210 rows from the left table ("left-side rows") are sorted and at 220 rows from the right table ("right-side rows") are sorted. Filter conditions from the subquery on the right table ("right table filter") are applied when forming the right-side rows; the right-side rows thus exclude any rows not satisfying the filter condition.

If, during the sort of the right side, a row is encountered that contains a NULL value, then at 230 the sort merge join operation is terminated and no rows are returned as the result of the anti-join operation. If the set of right rows is empty, then at 240 all left-side rows are qualified for the anti-join, including the ones containing NULL values.

Otherwise, at 250, the left-side rows that contain a NULL value are removed from this set. At 260, any left-side row with no matching row in the right-side is qualified for the anti-join.

Hash Join

Figure 3:
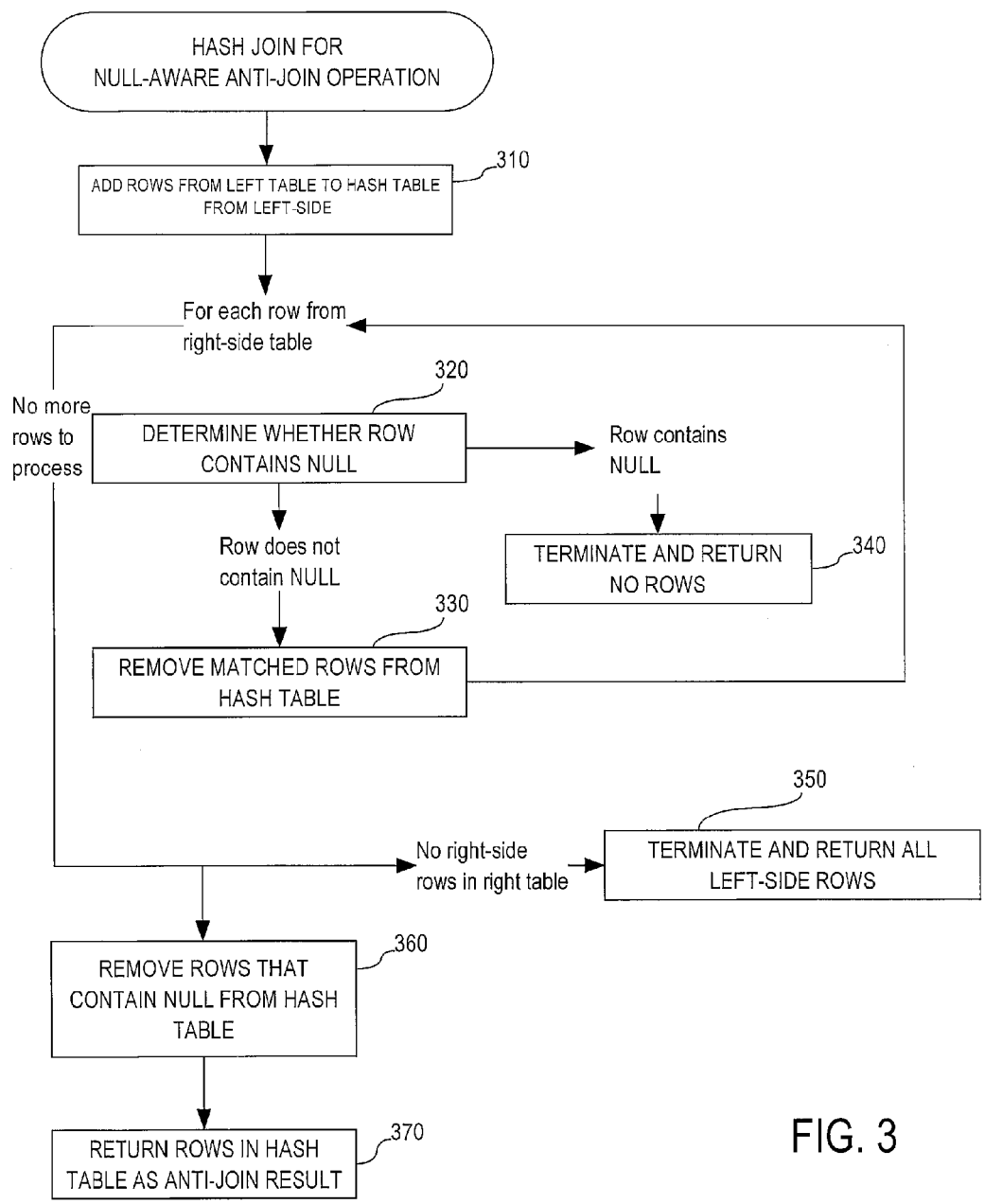
FIG. 3 depicts a procedure for performing a hash join according to an embodiment of the present invention.

FIG. 3 is a flow chart showing a procedure for performing a hash join. Referring to FIG. 3, at 310, the rows from the left table are added to a hash table that hashes the connecting column of the left table. Next, a loop comprising operations 320 and 330 is performed iteratively for each row from the right table. During each iteration, a row is examined. At 320 it is determined whether the row contains a NULL value. If so, then at 340 the procedure is terminated and no rows are qualified for the null-aware anti-join. Otherwise, at 330 if the row matches any left-side row, the left-side row is removed from the hash table.

If the right table contained no rows (e.g. because no rows satisfied a right side filter conditions), then at 350 the procedure terminates and all rows from the left table are qualified for the null-aware anti-join. Otherwise, at 360 rows containing NULL values are removed from the hash table. At 370, rows in the hash table are returned as a result of the null-aware anti-join.

Index-Based Nested-loops Join

An index-based nested-loops regular anti-join is a join operation that is performed iteratively, with an iteration for each row in the left table. For each iteration, the right table is scanned (i.e. using an index probe that reads and traverses only a portion of the index and/or the table) to determine whether there are any matching rows. If a matching row is found, then the row from the left table is disqualified. If not, then the row from the left table is qualified for the anti-join. In an implementation of the nested-loops join, the determination of whether a left-side row qualifies for the anti-join can only be made during the iteration for that row.

A nested-loops join for anti-join unnesting is performed using a regular anti-join, subject to the following. The first time the right table is scanned, when attempting to find a match for the first row of the left table, a check will be made for whether the right table has any rows satisfying the predicates or not. If this check finds that the right table is empty, then all the rows from the left will be qualified for the anti-join, without any further scans of the right table. For null-aware anti-join, if this check finds that the right table is not empty, then any row from the left table that has a NULL value in the joining column will be disqualified.

A non-correlated NOT EXISTS subquery is added to the predicate of the outer query in the rewritten query. The subquery evaluates to a constant whose value indicates whether the right table contains a NULL value in the joining column. Query Q6 represents a rewritten query of Q1 rewritten in this way.

```
Q6:   SELECT T1.c
      FROM T1, T2
      WHERE T1.x NA= T2.y and T2.z > 10 and
      NOT EXISTS (SELECT 1
                  FROM T2
                  WHERE T2.z > 10 and
                  T2.y IS NULL);
```

In the execution plan for the rewritten query, the uncorrelated subquery is computed before the anti-join operation. If the results of the subquery indicate that a right table row contains a NULL value, all rows from the left table are disqualified from the anti-join and the anti-join is never computed. The cost of the uncorrelated NOT EXISTS subquery is added to the cost of doing nested-loop null-aware anti-join, which is then compared with sort-merge null-aware anti-join and hash null-aware anti-join; the least expensive of three join methods is then selected. When sort-merge or hash null-aware anti-join is selected, the uncorrelated NOT EXISTS subquery is removed.

Null Safe Indexes

To scan rows of the left and right tables, the sort merge, hash and nested-loops join operations may use an index having a joining column as an index key. Since the procedures for these depend on detecting rows that contain NULL values, it is important that any index used to scan for rows in the tables be "null safe", that is, contain entries for columns containing NULL values in the joining column. If the index was not NULL safe, the fact that a row contains a NULL value cannot be detected by a scan using the index.

Typically, a bitmap index contains entries for a NULL key column while a b-tree index does not, unless the key of the b-tree index is a concatenated key and at least one of the key columns is constrained to non-NULL values. If a NULL safe index is not available to scan the table, then a full table scan may be used.

Hardware Overview

Figure 4:
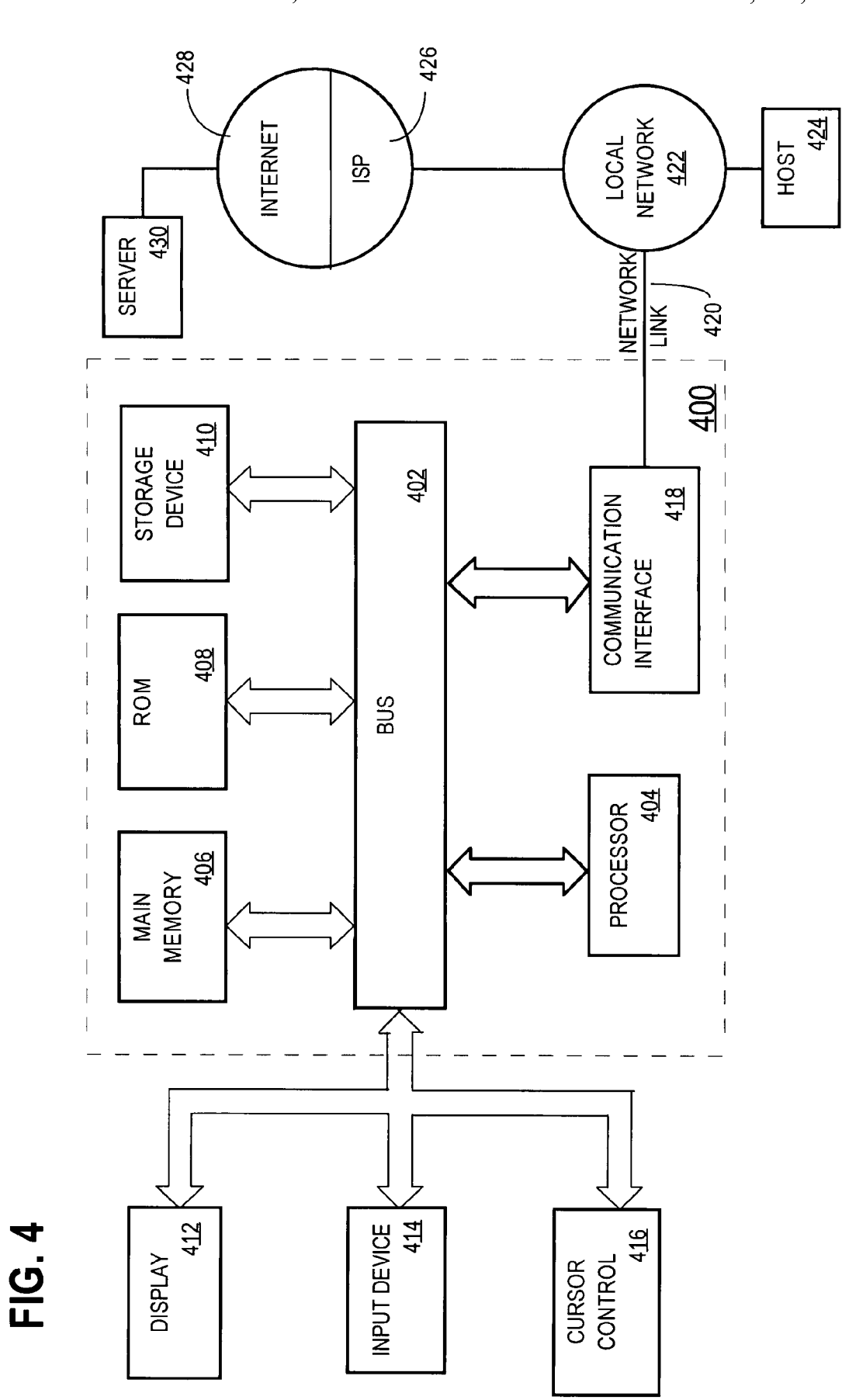
FIG. 4 depicts a computer system which may be used to implement an embodiment of the present invention.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method comprising steps of:
   based on a join condition of an anti-join operation, executing the anti-join operation based on a left table and a right table;
   wherein said join condition is based on a joining column of said right table and a joining column of said left table;
   wherein executing the anti-join operation comprises qualifying rows to be returned within a result of the anti-join operation, wherein:
      if said right table is empty, then qualifying all rows from the left table to be returned in the result of the anti-join operation;
      if at least one row from the right table includes a NULL value in the joining column of the right table, then qualifying in no rows to be returned in the result of the anti-join operation; and
      if no row from the right table includes the NULL value in the joining column of the right table, then qualifying in those rows from the left table to be returned in the result of the anti-join operation that, based on the join condition, do not match rows from the right table and do not include a NULL value in the joining column of the left table; and
   wherein the steps of the method are performed by one or more computing devices.

2. The method of claim 1, wherein executing the anti-join operation includes:
   generating a sorted set of left-side rows from the left table;
   generating a sorted set of right-side rows from the right table;
   during generation of the sorted set of right-side rows, detecting that a row from the right table includes a NULL value in the joining column of the right table; and
   in response to detecting that a row from the right table includes a NULL value, qualifying no rows.

3. The method of claim 1, wherein executing the anti-join operation includes:
   generating a sorted set of left-side rows from the left table;
   generating a sorted set of right-side rows from the right table;
   wherein the joining column of the right-side rows includes no NULL value;
   establishing as qualified rows of the anti-join operation, rows from the set of left-side rows that:
      do not include a NULL value in the respective joining column; and based on the join condition, do not match a row in the set of right-side rows.

4. The method of claim 1, the steps further including:
generating a sorted set of left-side rows from the left table;
attempting to generate a sorted set of right-side rows from the right table;
determining that the set of right side rows from the right table is an empty set; and
in response to determining that the set of right side rows from the right table is an empty set, establishing as qualified rows of the anti-join operation all rows from the set of left-side rows.

5. The method of claim 1, the steps further including:
based on the joining column of the left table, generating a hash table of left-side rows from the left table;
for each row of one or more rows from the right table, examining said each row, wherein examining each row includes:
determining whether said each row contains a NULL value in the joining column of said each row; and
if said each row contains a NULL value in the joining column of said each row, then establishing no rows from the left table as qualified for said anti-join operation.

6. The method of claim 5, wherein examining said each row of the one or more rows from the right table includes examining a particular row that does not have a NULL value in the joining column of the right table, wherein examining said particular row includes:
determining whether said particular row matches a row from said left table based on the join condition; and
if said particular row matches a row from said left table, removing said particular row from the hash table built for the left table.

7. The method of claim 1, the steps further including:
based on the joining column of the left table, generating a hash table of left-side rows from the left table;
wherein said joining column of said right table does not include a NULL value;
for each row of one or more rows from the right table, examining said each row, wherein examining each row includes:
determining whether said each row matches a row from said left table based on the join condition; and
if said each row matches a left-side row from said left table, removing said left-side row from the hash table;
establishing as qualified rows of the anti-join operation, left-side rows from the hash table that do not include a NULL value in the joining column of the left table.

8. The method of claim 1, the steps further including:
for each left-side row from the left table:
determining whether said each joining column of the left-side row contains a NULL value;
if said connecting column of said left-side row contains a NULL value, then disqualifying said each left-side row; and
if said connection column of said left-side row does not contain a null value, then:
performing a table scan of the right table; and
qualifying a right side row scanned by said table scan with a joining column matching the joining column of the left table.

9. The method of claim 8, further including the step of determining whether any row from the right table contains a NULL value by executing a certain subquery that returns a value that indicates whether a right side row from the right table contains a NULL value in the connecting column.

10. The method of claim 1, wherein executing the anti-join operation includes executing a nested-loops join operation, said nested-loops join operation including:
for a left-side row from the left table:
performing an index probe of at least a portion of the right table to determine whether a right-side row matches the left-side row, and
based on the index probe, determining that the right table is empty; and
in response to determining that the right table is empty, qualifying all rows in the left table.

11. A computer-implemented method comprising steps of:
rewriting a query that includes a NOT IN/ALL subquery based on a right table, a left table, and a connecting condition based on a connecting column of the right table and a connecting column of the left table;
wherein rewriting said query comprises unnesting said query to produce a transformed query that specifies an anti-join operation based on the right table, the left table, and the connecting condition;
wherein unnesting said query comprises one or more of:
merging an operand of said subquery into an outer portion of said query; and
creating an inline view for said subquery;
wherein rows from said left table include a NULL value in the connecting column of the left table; and
wherein the steps of the method are performed by one or more computing devices.

12. The method of claim 11, wherein:
said NOT IN/ALL subquery includes a filter condition that applies to the right table; and
said rows from said left-side that include a NULL value also satisfy said filter condition.

13. The method of claim 11, wherein said anti-join operation qualifies:
if said right table is empty, all rows from the left table;
if at least one row from the right table includes a NULL value in the connecting column of the right table, no rows;
if no row from the right table includes a NULL value in the connecting column of the right table, rows from the left table that, based on the connecting condition, do not match rows from the right table and do not include a NULL value in the connecting column of the left table.

14. The method of claim 11, wherein:
rewriting said query includes generating a certain subquery within said transformed query that returns a value that indicates whether a row from the right table contains a NULL value in the connecting column;
the steps further include generating a certain execution plan that performs a nested-loops join for said anti-join operation; and
wherein said certain execution plan does not execute said nested-loops join if said certain subquery returns a value that indicates that a row from the right table contains a NULL value in the connecting column.

15. The method of claim 14, further including:
generating another execution plan that does not use a nested-loops join for said anti-join operation; and
comparing a cost of said another execution plan to a cost of said certain execution plan, wherein said cost of said certain execution plan includes a cost based on said subquery.

16. The method of claim 14, wherein the steps of generating said certain subquery and said execution plan are performed if said left table contains a NULL value in said connecting column of the left table.

17. A machine-readable volatile or non-volatile medium storing one or more sequences of instructions which, when executed by one or more processors, cause performance of steps comprising:

based on a join condition of an anti-join operation, executing the anti-join operation based on a left table and a right table;

wherein said join condition is based on a joining column of said right table and a joining column of said left table; and wherein executing the anti-join operation comprises qualifying rows to be returned within a result of the anti-join operation, wherein:

if said right table is empty, then qualifying in all rows from the left table to be returned in the result of the anti-join operation;

if at least one row from the right table includes a NULL value in the joining column of the right table, then qualifying no rows to be returned in the result of the anti-join operation; and if no row from the right table includes the NULL value in the joining column of the right table, then qualifying in those rows from the left table to be returned in the result of the anti-join operation that, based on the join condition, do not match rows from the right table and do not include a NULL value in the joining column of the left table.

18. The machine-readable volatile or non-volatile medium of claim 17, wherein the instructions that cause performance of the step of executing the anti-join operation include instructions which, when executed by the one or more processors, cause performance of the steps of:

generating a sorted set of left-side rows from the left table;

generating a sorted set of right-side rows from the right table;

during generation of the sorted set of right-side rows, detecting that a row from the right table includes a NULL value in the joining column of the right table; and in response to detecting that a row from the right table includes a NULL value, qualifying no rows.

19. The machine-readable volatile or non-volatile medium of claim 17, wherein the instructions that cause performance of the step of executing the anti-join operation include instructions which, when executed by the one or more processors, cause performance of the steps of:

generating a sorted set of left-side rows from the left table;

generating a sorted set of right-side rows from the right table;

wherein the joining column of the right-side rows includes no NULL value;

establishing as qualified rows of the anti-join operation, rows from the set of left-side rows that:

do not include a NULL value in the respective joining column; and based on the join condition, do not match a row in the set of right-side rows.

20. The machine-readable volatile or non-volatile medium of claim 17, wherein the one or more sequences of instructions further include instructions which, when executed by the one or more processors, cause performance of the steps of:

generating a sorted set of left-side rows from the left table;

attempting to generate a sorted set of right-side rows from the right table;

determining that the set of right side rows from the right table is an empty set; and in response to determining that the set of right side rows from the right table is an empty set, establishing as qualified rows of the anti-join operation all rows from the set of left-side rows.

21. The machine-readable volatile or non-volatile medium of claim 17, wherein the one or more sequences of instructions further include instructions which, when executed by the one or more processors, cause performance of the steps of:

based on the joining column of the left table, generating a hash table of left-side rows from the left table;

for each row of one or more rows from the right table, examining said each row, wherein examining each row includes:

determining whether said each row contains a NULL value in the joining column of said each row; and if said each row contains a NULL value in the joining column of said each row, then establishing no rows from the left table as qualified for said anti-join operation.

22. The machine-readable volatile or non-volatile medium of claim 21, wherein the instructions that cause performance of the step of examining said each row of the one or more rows from the right table include instructions which, when executed by the one or more processors, cause performance of a step of examining a particular row that does not have a NULL value in the joining column of the right table, wherein the step of examining said particular row includes:

determining whether said particular row matches a row from said left table based on the join condition; and if said particular row matches a row from said left table, removing said particular row from the hash table built for the left table.

23. The machine-readable volatile or non-volatile medium of claim 17, wherein the one or more sequences of instructions further include instructions which, when executed by the one or more processors, cause performance of the steps of:

based on the joining column of the left table, generating a hash table of left-side rows from the left table;

wherein said joining column of said right table does not include a NULL value;

for each row of one or more rows from the right table, examining said each row, wherein examining each row includes:

determining whether said each row matches a row from said left table based on the join condition; and if said each row matches a left-side row from said left table, removing said left-side row from the hash table;

establishing as qualified rows of the anti-join operation, left-side rows from the hash table that do not include a NULL value in the joining column of the left table.

24. The machine-readable volatile or non-volatile medium of claim 17, wherein the one or more sequences of instructions further include instructions which, when executed by the one or more processors, cause performance of the steps of:

for each left-side row from the left table:

determining whether said each joining column of the left-side row contains a NULL value;

if said connecting column of said left-side row contains a NULL value, then disqualifying said each left-side row; and if said connection column of said left-side row does not contain a null value, then:

performing a table scan of the right table; and qualifying a right side row scanned by said table scan with a joining column matching the joining column of the left table.

25. The machine-readable volatile or non-volatile medium of claim 24, wherein the one or more sequences of instructions further include instructions which, when executed by the one or more processors, cause performance of a step of determining whether any row from the right table contains a NULL value by executing a certain subquery that returns a value that indicates whether a right side row from the right table contains a NULL value in the connecting column.

26. The machine-readable volatile or non-volatile medium of claim 17, wherein the instructions that cause performance of the step of executing the anti-join operation include instructions which, when executed by the one or more processors, cause performance of a step of executing a nested-loops join operation, wherein executing said nested-loops join operation includes:
   for a left-side row from the left table:
      performing an index probe of at least a portion of the right table to determine whether a right-side row matches the left-side row, and
      based on the index probe, determining that the right table is empty; and
   in response to determining that the right table is empty, qualifying all rows in the left table.

27. A machine-readable volatile or non-volatile medium storing one or more sequences of instructions which, when executed by one or more processors, cause performance of steps comprising:
   rewriting a query that includes a NOT IN/ALL subquery based on a right table, a left table, and a connecting condition based on a connecting column of the right table and a connecting column of the left table;
   wherein rewriting said query comprises unnesting said query to produce a transformed query that specifies an anti-join operation based on the right table, the left table, and the connecting condition;
   wherein unnesting said query comprises one or more of:
      merging an operand of said subquery into an outer portion of said query; and
      creating an inline view for said subquery; and
   wherein rows from said left table include a NULL value in the connecting column of the left table.

28. The machine-readable volatile or non-volatile medium of claim 27, wherein:
   said NOT IN/ALL subquery includes a filter condition that applies to the right table; and
   said rows from said left-side that include a NULL value also satisfy said filter condition.

29. The machine-readable volatile or non-volatile medium of claim 27, wherein said anti-join operation qualifies:
   if said right table is empty, all rows from the left table;
   if at least one row from the right table includes a NULL value in the connecting column of the right table, no rows;
   if no row from the right table includes a NULL value in the connecting column of the right table, rows from the left table that, based on the connecting condition, do not match rows from the right table and do not include a NULL value in the connecting column of the left table.

30. The machine-readable volatile or non-volatile medium of claim 27, wherein:
   the instructions that cause performance of the step of rewriting said query include instructions which, when executed by the one or more processors, cause performance of a step of generating a certain subquery within said transformed query that returns a value that indicates whether a row from the right table contains a NULL value in the connecting column;
   the one or more sequences of instructions further include instructions which, when executed by the one or more processors, cause performance of a step of generating a certain execution plan that performs a nested-loops join for said anti-join operation; and
   wherein said certain execution plan does not execute said nested-loops join if said certain subquery returns a value that indicates that a row from the right table contains a NULL value in the connecting column.

31. The machine-readable volatile or non-volatile medium of claim 30, wherein the one or more sequences of instructions further include instructions which, when executed by the one or more processors, cause performance of the steps of:
   generating another execution plan that does not use a nested-loops join for said anti-join operation; and
   comparing a cost of said another execution plan to a cost of said certain execution plan, wherein said cost of said certain execution plan includes a cost based on said subquery.

32. The machine-readable volatile or non-volatile medium of claim 30, wherein the instructions that cause performance of the steps of generating said certain subquery and said execution plan are executed if said left table contains a NULL value in said connecting column of the left table.

* * * * *